(12) United States Patent
Sullivan, Jr. et al.

(10) Patent No.: US 10,032,211 B2
(45) Date of Patent: Jul. 24, 2018

(54) ANONYMOUS ELECTRONIC TRANSACTIONS

(71) Applicant: Intel Corporation, Santa Clara, CA (US)

(72) Inventors: Robert R. Sullivan, Jr., Camp Connel, CA (US); David W. Aucsmith, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 15 days.

(21) Appl. No.: 13/858,548

(22) Filed: Apr. 8, 2013

(65) Prior Publication Data

US 2014/0136374 A1   May 15, 2014

Related U.S. Application Data

(63) Continuation of application No. 11/736,427, filed on Apr. 17, 2007, now Pat. No. 8,417,216, which is a
(Continued)

(51) Int. Cl.
*G06F 17/30* (2006.01)
*G06Q 30/06* (2012.01)
(Continued)

(52) U.S. Cl.
CPC ......... *G06Q 30/0635* (2013.01); *G06Q 20/02* (2013.01); *G06Q 20/04* (2013.01);
(Continued)

(58) Field of Classification Search
CPC ............... G06Q 30/02; G06Q 30/0623; G06Q 30/0633; G06Q 30/0619; G06F 17/30; G06F 17/60; G06F 15/16; H04L 9/30
See application file for complete search history.

(56) References Cited

U.S. PATENT DOCUMENTS 5,583,918 A   12/1996   Nakagawa
5,822,737 A   10/1998   Ogram
(Continued)

FOREIGN PATENT DOCUMENTS

EP      0965902 A2    12/1999
JP      10-074221 A    3/1998
(Continued)

OTHER PUBLICATIONS

Office Action Received for Chinese Patent Application No. 200810166520.4, dated Sep. 2, 2013, 7 pages of Chinese office action and 6 pages of English Translation.
(Continued)

*Primary Examiner* — Myron K Wyche

(57) ABSTRACT

Techniques are disclosed for protecting privacy of parties to electronic transactions, such as transactions conducted through a GSM network. An anonymity service provider receives orders directed from its subscriber to a recipient for goods or services, along with information about its subscriber. The anonymity service provider relays the order to the recipient but withholds information about the subscriber, as the subscriber directs. The recipient receives payment for the good or service by way of a voucher from the anonymity service provider.

16 Claims, 6 Drawing Sheets

Related U.S. Application Data continuation of application No. 09/751,322, filed on Dec. 29, 2000, now Pat. No. 7,242,921.

(51) Int. Cl.
*G06Q 20/02* (2012.01)
*G06Q 20/04* (2012.01)
*G06Q 20/24* (2012.01)
*G06Q 20/32* (2012.01)
*G06Q 20/42* (2012.01)
*G06Q 20/16* (2012.01)

(52) U.S. Cl.
CPC ........... *G06Q 20/045* (2013.01); *G06Q 20/16* (2013.01); *G06Q 20/24* (2013.01); *G06Q 20/32* (2013.01); *G06Q 20/3229* (2013.01); *G06Q 20/425* (2013.01); *G06Q 30/06* (2013.01)

(56) References Cited

U.S. PATENT DOCUMENTS

| | | | |
|---|---|---|---|
| 5,896,499 A | 4/1999 | McKelvey | |
| 5,903,878 A * | 5/1999 | Talati | G06Q 20/02 705/26.41 |
| 5,963,917 A | 10/1999 | Ogram | |
| 6,006,200 A | 12/1999 | Joy et al. | |
| 6,151,588 A | 11/2000 | Tozzoli et al. | |
| 6,182,891 B1 * | 2/2001 | Furuhashi | G06K 19/08 235/379 |
| 6,275,824 B1 * | 8/2001 | O'Flaherty | G06F 21/6227 |
| 6,370,514 B1 | 4/2002 | Messner | |
| 6,516,996 B1 | 2/2003 | Hippelainen | |
| 6,629,149 B1 * | 9/2003 | Fraser | H04L 29/12066 709/220 |
| 6,646,659 B1 | 11/2003 | Brown et al. | |
| 7,165,174 B1 * | 1/2007 | Ginter | H04L 9/3263 705/51 |
| 7,167,174 B2 * | 1/2007 | Wardetzky et al. | 345/420 |
| 7,203,315 B1 | 4/2007 | Livesay | |
| 7,308,426 B1 | 12/2007 | Pitroda | |
| 7,366,695 B1 | 4/2008 | Allen-Rouman et al. | |
| 8,468,089 B1 * | 6/2013 | Abad-Peiro | G06Q 20/00 705/35 |
| 2002/0023006 A1 * | 2/2002 | Partos et al. | 705/26 |
| 2002/0035538 A1 | 3/2002 | Moreauu | |
| 2002/0069114 A1 | 6/2002 | Charette et al. | |
| 2002/0069166 A1 | 6/2002 | Moreau et al. | |
| 2002/0086660 A1 | 7/2002 | Sullivan et al. | |
| 2004/0198373 A1 | 10/2004 | Ford et al. | |

FOREIGN PATENT DOCUMENTS

| | | |
|---|---|---|
| KR | 2000-0068469 | 11/2000 |
| WO | 96/13814 A1 | 5/1996 |
| WO | 97/10560 A1 | 3/1997 |
| WO | 98/10361 A1 | 3/1998 |
| WO | 00/65517 A1 | 11/2000 |
| WO | 00/67178 A2 | 11/2000 |
| WO | 02/054321 A2 | 7/2002 |
| WO | 02/054321 A8 | 10/2002 |

OTHER PUBLICATIONS

Office Action Received for Chinese Patent Application No. 200810166520.4, dated Jan. 28, 2014, 13 pages of Chinese office action and 1 page of English Translation only.
Extended European Search Report received for European Patent Application No. 10184836.4 dated Apr. 20, 2011, 4 pages.
Notice of Allowance received for U.S. Appl. No. 09/751,322, dated Dec. 13, 2006, 7 pages.
Notice of Allowance received for U.S. Appl. No. 11/736,427, dated Dec. 10, 2012, 7 pages.
Communication issued in related European Patent Application, pp. 8.
International Preliminary Report on Patentability received for PCT Patent Application No. PCT/US2001/50662, completed on Jul. 20, 2005, 4 pages.
Certified translation of Japanese Publication No. 10-074221.
Office Action Received for Chinese Patent Application No. 0101821592.0, dated Mar. 14, 2008, 7 pages of Chinese office action and 11 pages of English Translation.
Office Action Received for Chinese Patent Application No. 200810166520.4, dated Nov. 9, 2010, 3 pages of Chinese office action and 5 pages of English Translation.
Office Action Received for Chinese Patent Application No. 200810166520.4, dated Mar. 15, 2010, 4 pages of Chinese office action and 6 pages of English Translation.
Office Action Received for Chinese Patent Application No. 200810166520.4, dated Mar. 15, 2011, 6 pages of English Translation only.
Office Action Received for Chinese Patent Application No. 200810166520.4, dated Aug. 9, 2011, 5 pages of Chinese office action and 8 pages of English Translation.
Office action received for U.S. Appl. No. 09/751,322, dated May 12, 2005, 10 pages of Office Action.
Office action received for U.S. Appl. No. 09/751,322, dated Dec. 22, 2003, 9 pages of Office Action.
Office action received for U.S. Appl. No. 09/751,322, dated Mar. 11, 2005, 10 pages of Office Action.
Office action received for U.S. Appl. No. 09/751,322, dated Jan. 26, 2006, 9 pages of Office Action.
Final Office action received for U.S. Appl. No. 09/751,322, dated Jul. 1, 2004, 11 pages of Office Action.
Final Office action received for U.S. Appl. No. 09/751,322, dated Jun. 16, 2006, 11 pages of Office Action.
Final Office action received for U.S. Appl. No. 11/736,427, dated Jul. 7, 2010, 19 pages of Office Action.
Non-Final Office action received for U.S. Appl. No. 11/736,427, dated Oct. 9, 2007, 10 pages of Office Action.
Non-Final Office action received for U.S. Appl. No. 11/736,427, dated Sep. 21, 2009, 19 pages of Office Action.

* cited by examiner

US 10,032,211 B2

ANONYMOUS ELECTRONIC TRANSACTIONS

CROSS-REFERENCE TO RELATED APPLICATIONS

This application is a continuation application of and claims priority to U.S. patent application Ser. No. 11/736,427, filed Apr. 17, 2007, entitled "Anonymous Electronic Transactions," which is a continuation application and claims priority to U.S. patent application Ser. No. 09/751,322, filed Dec. 29, 2000, and now issued as U.S. Pat. No. 7,242,921. The disclosures of the prior applications are considered part of (and herein incorporated by reference) the disclosure of this application.

BACKGROUND

GSM originally stood for Groupe Spécial Mobile, a European study group formed in 1982 to study and develop criteria for a pan-European mobile telephone system. GSM is currently recognized as an acronym for Global System for Mobile communications, and represents the criteria developed as a result of the work of the Groupe Spécial Mobile. In general, GSM represents a set of mobile telephone standards and specifications. Equipment that meets GSM standards in one GSM network is compatible with any GSM network. GSM networks now exist worldwide.

DETAILED DESCRIPTION

The techniques described below allow network subscribers to conduct electronic transactions with providers of goods and services, while maintaining a degree of personal privacy. The techniques are especially advantageous in the context of a GSM network, but are not limited to GSM.

GSM systems are digital systems that employ time division multiple access technology, allowing several subscribers to share a frequency channel at the same time. GSM systems are intended to interface with digital communication networks such as the Integrated Services Digital Network (ISDN). GSM systems are also intended to work with analog communication systems, such as the Public Switched Telephone Network (PSTN).

Figure 1:
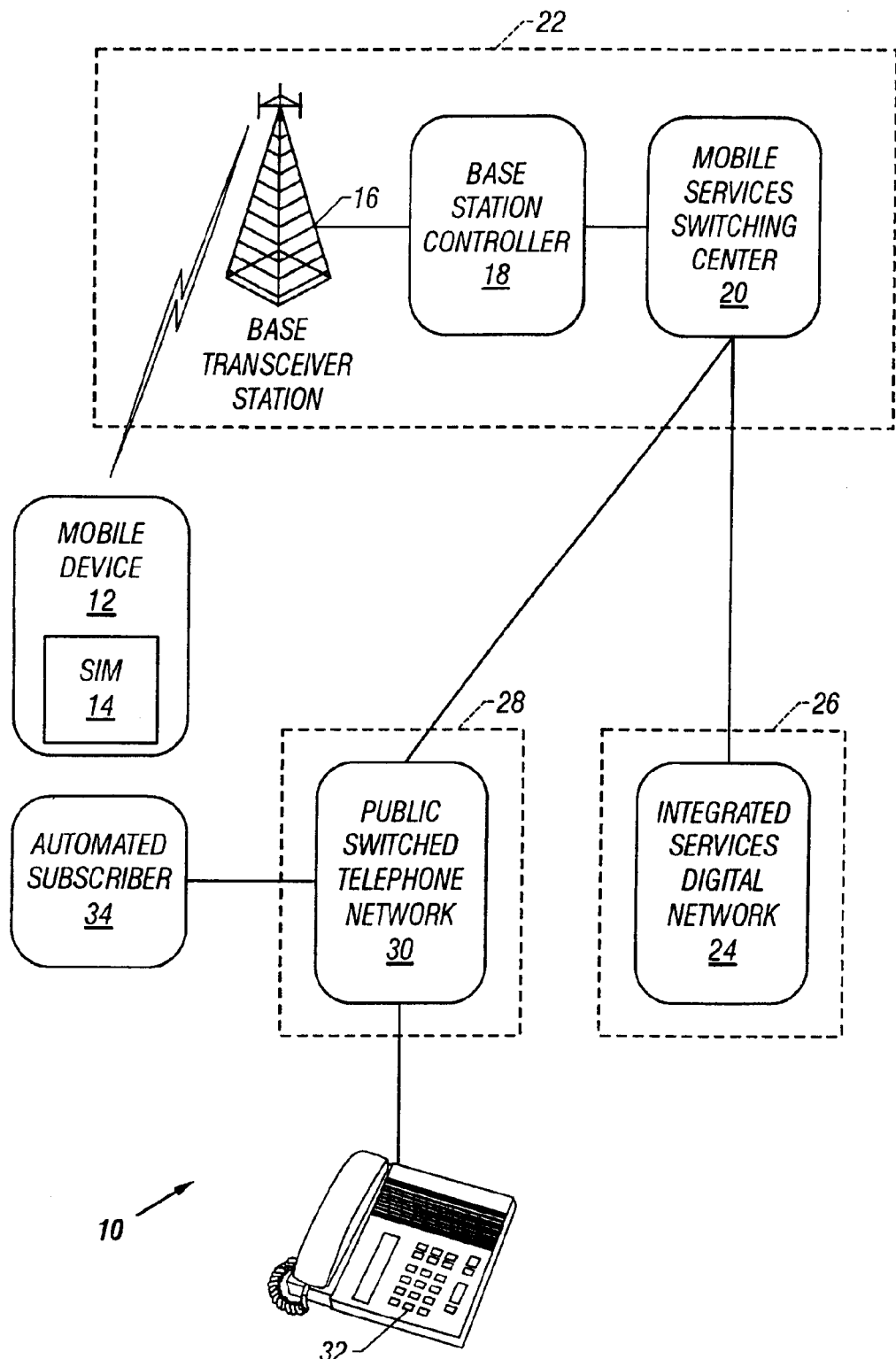
FIG. 1 is a diagram of a communications network.

FIG. 1 shows a typical communications network 10 that includes GSM systems. A subscriber obtains wireless access to network 10 via mobile device 12. Mobile device 12 may be any kind of terminal that accesses network 10, such as a mobile telephone handset. Mobile device 12 typically is assigned a unique International Mobile device Identity, which identifies each piece of mobile device 12 to network 10. In addition, mobile device 12 interfaces with Subscriber Identity Module (SIM) 14, which uniquely identifies the subscriber to network 10. A typical SIM 14 is a smart card that is inserted into a GSM terminal. The subscriber can make and receive calls with mobile device 12.

Mobile device 12 accesses network 10 by establishing a wireless communication link with a base transceiver station 16. Base transceiver station 16 includes a transceiver that defines a cellular calling area. Base transceiver station 16 typically handles the wireless protocols with mobile device 12. A plurality of base station transceivers are generally managed by a base station controller 18. A plurality of base station controllers is usually coupled to a mobile services switching center 20, which typically acts as a central component in the cellular network. Base transceiver station 16, base station controller 18 and mobile services switching center 20 are typically operated under the auspices of a GSM provider 22.

Mobile services switching center 20 interfaces with other communication services, such as ISDN 24 and PSTN 30, each of which may be operated under the auspices of different communications suppliers 26, 28. ISDN 24 and PSTN 30 provide service to subscribers such as telephone customers 32. In addition, ISDN 24 and PSTN 30 may each connect to automated subscribers 34, such as computers, copying machines, toll booths or vending machines. Toll booths and vending machines, for example, may dispense services or goods when provided with a signal authorizing them to do so.

In typical network 10, a subscriber can use mobile device 12 to place an electronic order for goods or services. This transaction may be processed in several ways, such as by accessing an account or authorizing payment by credit card. One method for processing the transaction is to use subscriber data stored in SIM 14. Invoices can then be billed to the subscriber's account with GSM provider 22. Typically the entity receiving the order learns personal information from the subscriber's SIM 14 and mobile device 12, such as the subscriber's identity, location or calling pattern. In exchange for the simplicity of making an electronic transactional order for goods or services, subscribers may be giving up some of their privacy. The techniques described below allow GSM subscribers to preserve their privacy while making electronic transactional orders for goods and services.

Figure 2:
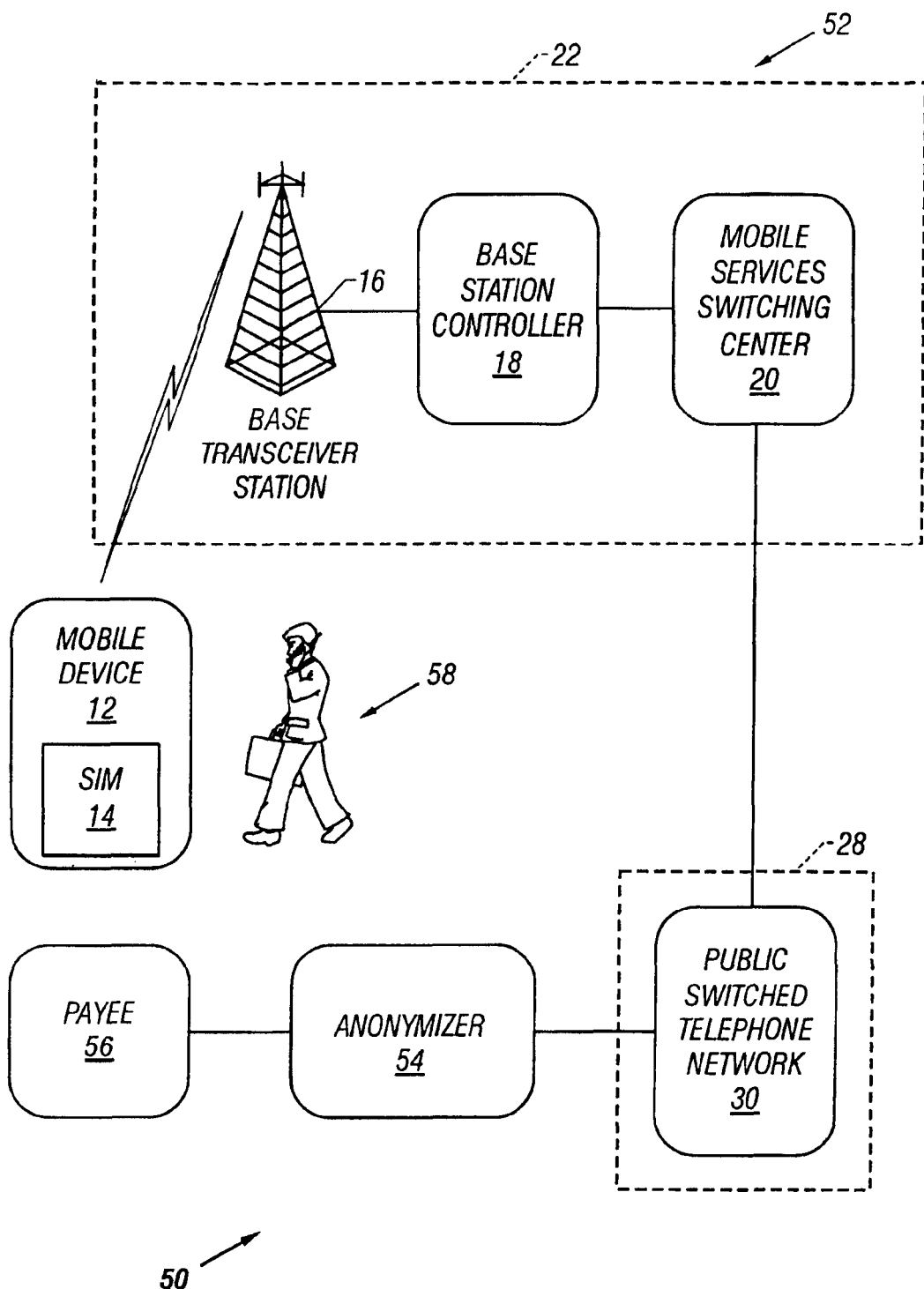
FIG. 2 is a diagram of a communications network including an anonymizer.

FIG. 2 shows a communications network 50 that includes a GSM system 52. Unlike network 10 of FIG. 1, network 50 of FIG. 2 includes an element 54 to be called herein an "anonymizer," because it provides anonymity service. In FIG. 2, anonymizer 54 provides anonymity service to GSM subscribers using network 50. Network 50 of FIG. 2 also includes a payee 56, which may be an automated subscriber like automated subscriber 34 in FIG. 1. A GSM user 58 who subscribes to the anonymity service provided by anonymizer 54 interfaces with network 50 via an interface such as mobile device 12. Payee 56 interfaces with network by way of an interface such as a connection to PSTN 30.

Anonymizer 54 is shown in FIG. 2 as interposed between PSTN 30 and payee 56, but anonymizer 54 may communicate with payee 56 by way of PSTN 30, or by way of another communication channel. Furthermore, anonymizer 54 could be placed at other locations in network 50. Anonymizer 54 could be, for example, part of GSM system 52 and operated under the auspices of GSM provider 22. Anonymizer 54 may alternatively be operated under the auspices of PSTN 30 or any other communication provider. The service of anonymizer 54 may also be offered by an anonymity service provider independent of the communication network. Furthermore, anonymizer 54 is not limited to application with an analog system such as PSTN 30, but may provide anonymity in a digital system such as ISDN 24 (not shown in FIG. 2).

Subscriber 58 to the anonymity service provided by anonymizer 54 may conduct transactions by providing no personal data or by providing a selected amount of personal data. Anonymizer 54 protects the privacy of subscriber 58 by providing no personal information, or limited personal information, to payee 56.

Figure 3:
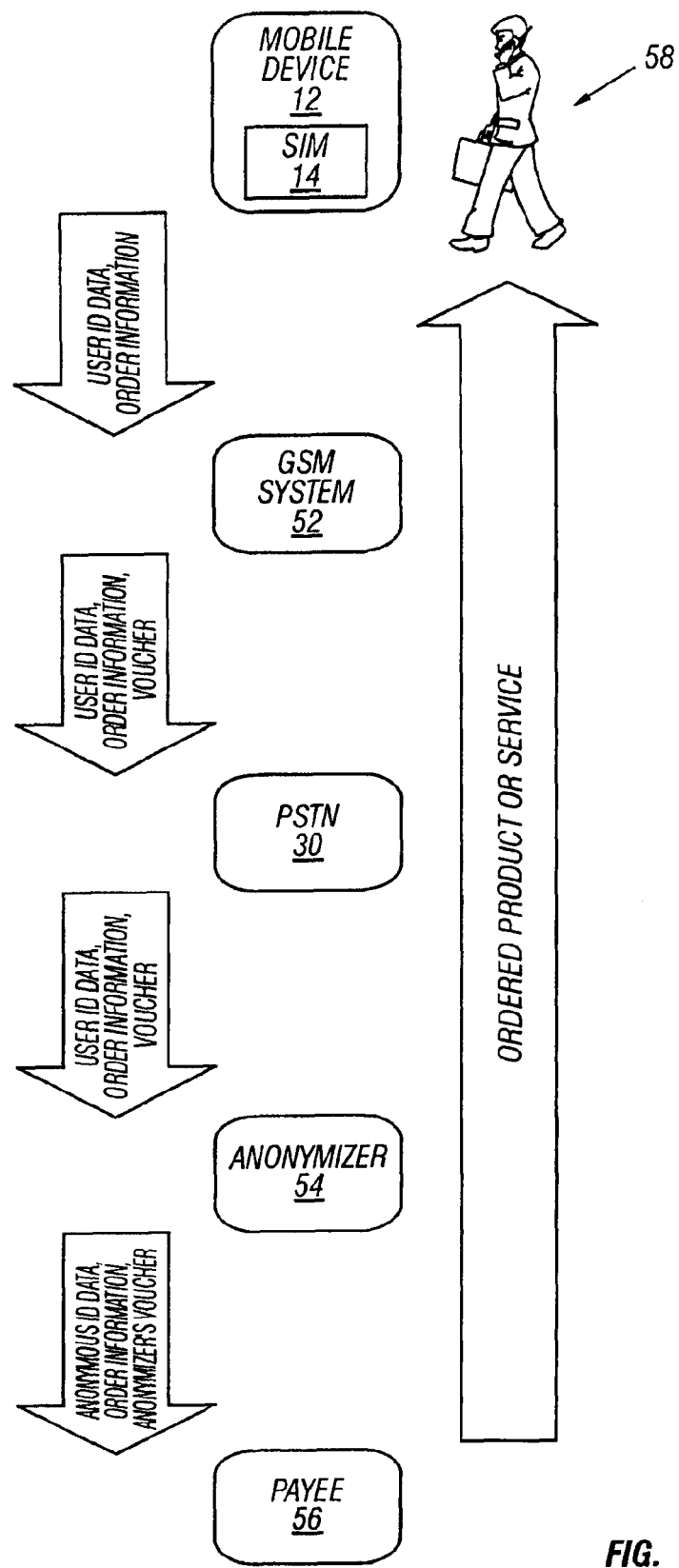
FIG. 3 is a conceptual diagram depicting the flow of data, and goods or services in an electronic transaction involving an anonymizer.

FIG. 3 illustrates an exemplary transaction using anonymizer 54. Subscriber 58 places an electronic transactional order for a good or service from payee 56, using mobile device 12. Subscriber 58 sends information that will be needed to process the order, such as the kind of service desired or the quantity of product needed. In addition, other information about subscriber 58 may be transmitted automatically, such as the name of the subscriber, the location of the call and the equipment used to make the order. This information is passed to GSM system 52, and may be relayed via PSTN 30 to anonymizer 54.

Anonymizer 54 relays the order information to payee 56 (via PSTN 30 or other communication channel), but does not relay the other information about subscriber 58. Instead, anonymizer 54 may pass along limited information about subscriber 58. The information passed along is authorized by subscriber 58. For example, anonymizer 54 may pass along an address to which delivery is requested. In addition, payee 56 may pass information to anonymizer 54 to be relayed to subscriber 58, such as a confirmation number, or a demand for additional information. Anonymizer 54 may also pass along to payee 56 personal information about subscriber 58, as will be described in more detail below. After receiving a satisfactory order, payee 56 provides the products or services to subscriber 58 or to a recipient designated by subscriber 58.

Payment for the products or services may be handled in several ways. As shown in FIG. 3, a voucher may be passed to anonymizer 54, which relays an anonymizer voucher to payee 56. In general, a voucher represents an electronic payment authorization, such as a credit or other record exchangeable for payment. The voucher transmitted by anonymizer 54 to payee 56 may also represent a guarantee of payment, such that payee 56 does not bear a risk of nonpayment for products or services delivered.

Subscriber 58 ultimately pays for the goods or services provided by payee 56, but subscriber 58 typically pays an entity other than payee 56. For example, as illustrated in FIG. 3, an arrangement between the GSM provider 22 and the anonymity service provider results in a voucher being transmitted from GSM system 52 to anonymizer 54. The bill for the goods or services may be added to the bill for GSM service sent to subscriber 58 by GSM provider 22. Alternatively, the bill for the goods or services is then to the bill sent to subscriber 58 by the anonymity service provider.

Figure 4:
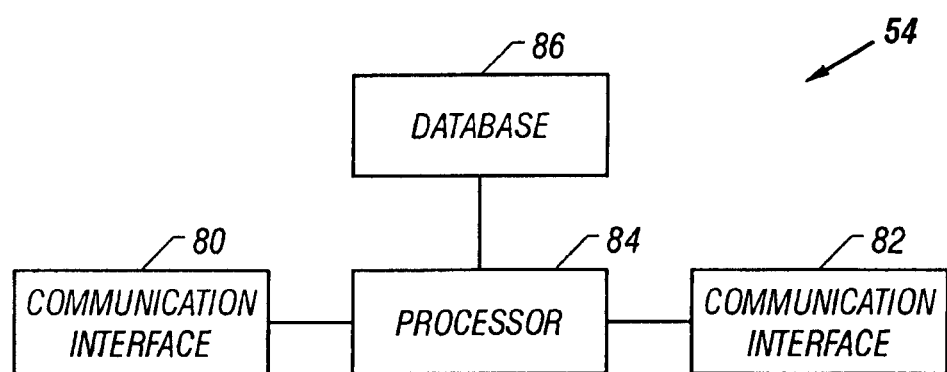
FIG. 4 is a diagram of an anonymizer.

A system diagram of anonymizer 54 is shown in FIG. 4. Anonymizer 54 includes communication interfaces 80 and 82, by which anonymizer 54 connects to PSTN 30 or ISDN 24, and by which anonymizer 54 communicates with subscriber 58 and payee 56. In some circumstances anonymizer 54 may function with a single communication interface. Anonymizer 54 also may include database 86, which stores information about subscribers, including directives as to the degree of anonymity desired by each subscriber.

Anonymizer 54 further includes processor 84, which performs several functions associated with anonymity service. For example, processor 84 retrieves information from database 86 about subscribers' desired anonymity. Processor 84 also receives subscribers' orders from one communication interface 80 and relays the orders via a second communication interface 82. In addition, processor 84 stores subscriber information in database 86. Anonymizer 54 may be implemented, for example, as a computer system. Techniques employed by anonymizer 54 may be implemented as software, which may be stored in a machine or computer system on any machine-readable medium such as a magnetic disk or optical drive, or may be stored within non-volatile memory such as read-only memory (ROM).

Figure 5:
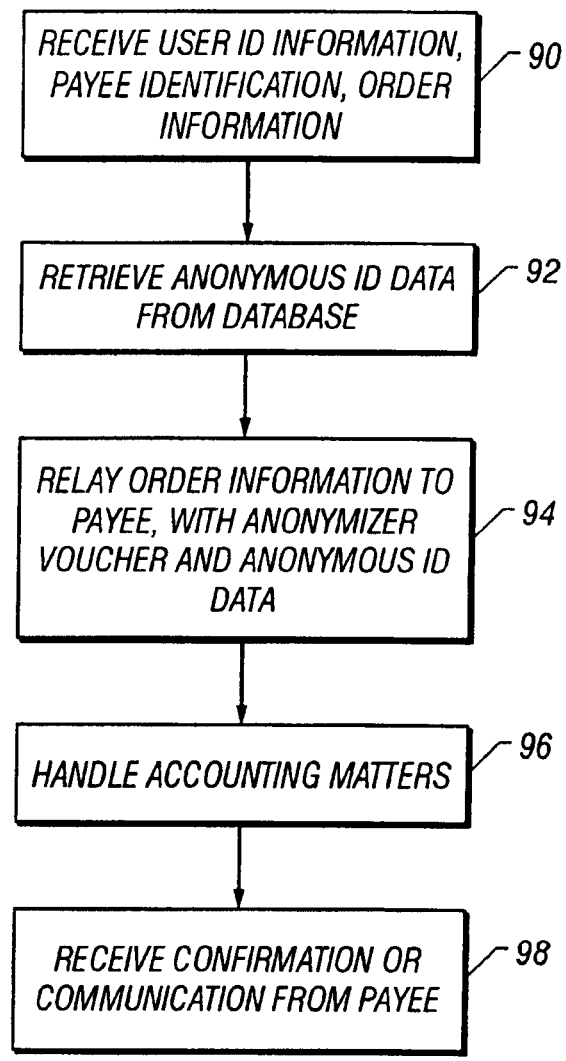
FIG. 5 is a flowchart illustrating techniques for providing anonymizer service.

FIG. 5 is a flowchart illustrating techniques for providing anonymizer service. In an exemplary configuration, anonymizer 54 receives data related to a subscriber's order, such as the identity of the payee, the product or service desired, and the quality or quantity desired (90). Anonymizer 54 also receives data identifying the subscriber (90). Anonymizer 54 retrieves from its database information about the subscriber, including, for example, the degree of privacy to be afforded the subscriber.

Several degrees of privacy may be offered, providing a range of anonymity. One degree of anonymity is total anonymity. A payee receives no personal information about a subscriber having total anonymity. The subscriber may specify a lesser degree of anonymity by allowing anonymizer 54 to relay to payee 56, for example, information about the subscriber's name but not information about the subscriber's address, telephone number or calling patterns. The subscriber may also specify that information about him be kept from payee 56, but that demographic information about him be disclosed. A subscriber may permit payee 56 to know the town where subscriber lives, for example, without disclosing the subscriber's name or address. A subscriber may also provide payee 56 with a pseudonym or a frequent-purchaser identification code. Another form of anonymity may vary on the basis of the identity of the payee. The subscriber may authorize disclosure of more personal data when ordering airplane tickets, for example, than when ordering flowers. A further form of anonymity involves "negotiated anonymity," which will be explained in more detail below.

After retrieving the information from the database (92), anonymizer 54 relays data to payee 56, such as the order and voucher information (94). Anonymizer 54 may also pass along to payee 56 anonymous identification data, i.e., data about the identity of the subscriber that the subscriber has authorized to be passed along. In addition, anonymizer 54 ordinarily processes the transaction (96), which may include debiting the subscriber's account for the voucher issued to payee 56, or acknowledging a voucher received from GSM provider 22. Anonymizer 54 may also relay information from payee 56 to the subscriber, such as a confirmation number (98).

Figure 6:
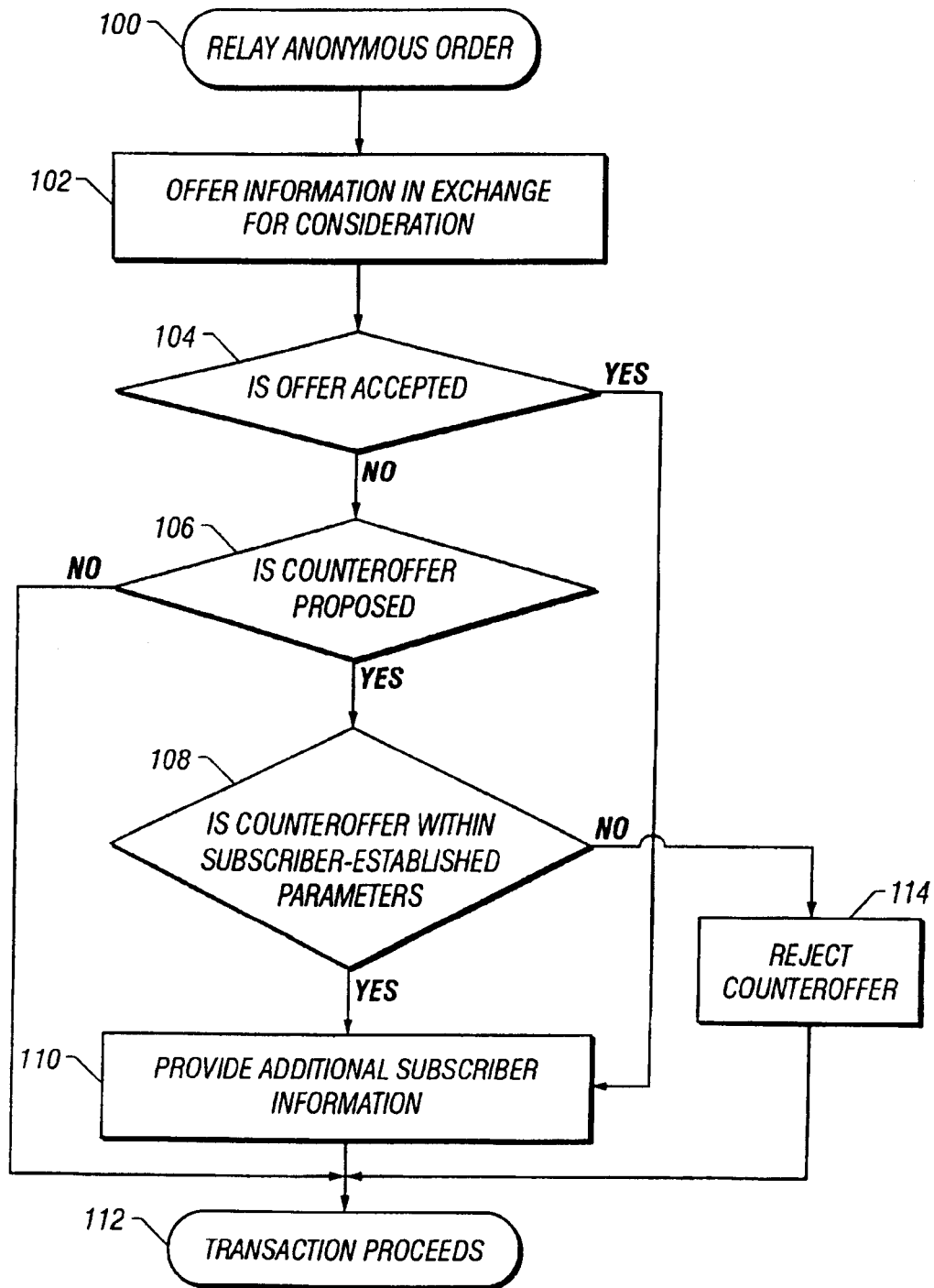
FIG. 6 is a flowchart illustrating variable anonymity.

As described above, anonymizer 54 may provide a range of anonymity. FIG. 6 is a flowchart illustrating a variable anonymity technique. In this technique, the degree of anonymity may become part of the transaction, and is automatically "negotiated" by anonymizer 54 on behalf of subscriber 58 and payee 56. Anonymizer 54 relays an anonymous order for a product or service to payee 56 (100), and includes an offer to provide additional information about subscriber 58 in exchange for consideration from payee 56, such as a discount. The offer is pre-authorized by subscriber 58. If payee 56 accepts (104), anonymizer 54 provides the additional information to payee 56 (110) and the transaction proceeds (112). Payee 56 may reject the offer and put forth a counteroffer (106). Payee's counteroffer may, for example, propose a smaller discount or request more information.

Anonymizer 54 evaluates the counteroffer according to parameters previously authorized by subscriber 58, which are stored in database 86. If the counteroffer is not within the parameters, the counteroffer is rejected (114) and the transaction proceeds (112). If the counteroffer is accepted, anonymizer 54 provides the additional information to payee 56 (110) and the transaction proceeds (112).

The techniques shown in FIG. 6 are for purposes of illustration. Variations of the techniques are possible. For example, payee 56 may initiate the offer to provide the product or service at a discount if additional information is provided, and anonymizer 54 may counteroffer. Subscriber 58 may also specify a range of permissible prices, quantities or degrees of personal information, allowing further offers and counteroffers. In addition, payee 56 may refuse to accept anonymous orders, in which case its counteroffer represents a stipulation that unless certain information is provided, there will be no transaction.

A number of embodiments of the invention have been described. Although the techniques for maintaining various degrees of anonymity have been described in the context of a GSM network, they may be adapted to any network in which a subscriber wishes to avoid having personal information passed to a payee. These and other embodiments are within the scope of the following claims.

The invention claimed is:

1. A system comprising:
   a processor communicatively coupled to a communication network; and
   a database communicatively coupled to the processor to store information about a subscriber and directives describing anonymizing information about the subscriber to be transmitted to a payee with whom an electronic order is placed,
   wherein the processor is to receive information about the subscriber, the subscriber connected to the communication network, wherein the processor is to receive a first electronic transactional order from the subscriber over the communication network, the first transactional order including payee information comprising an identity of the payee with whom the electronic order is placed, order information describing an item or a service ordered, and identity information regarding the subscriber placing the electronic order,
   wherein the processor is to transmit a second electronic transactional order to the payee based on the first electronic transactional order, the second electronic transactional order specifying payment from a third party, and wherein the database includes information about the subscriber and directives describing the information about the subscriber to be transmitted to the payee, and
   wherein the processor is to remove information from the identity information received about the subscriber based on the identity of the payee with whom the electronic order is placed included in the payee information of the first electronic transactional order, resulting in anonymized information, before transmitting the anonymized information to the payee in the second electronic transactional order.

2. The system of claim 1, wherein the communication network comprises a wireless cellular network.

3. The system of claim 2, wherein the subscriber comprises a mobile device associated with a wireless cellular subscriber, the mobile device comprising a Subscriber Identity Module (SIM).

4. The system of claim 1, wherein the communication network comprises a PSTN (Public Switched Telephone Network).

5. The system of claim 1, wherein the directives cause the processor to remove a name of the subscriber.

6. The system of claim 1, wherein the directives cause the processor to remove a location of the subscriber.

7. The system of claim 1, wherein the directives cause the processor to remove an address of the subscriber.

8. The system of claim 1, wherein the directives cause the processor to remove identification of equipment of the subscriber.

9. The system of claim 1, wherein the directives comprises directives associated with different degrees of anonymity.

10. The system of claim 1, wherein the subscriber specifies the directives.

11. The system of claim 1, wherein the processor is to transmit a confirmation from the payee to the subscriber.

12. The system of claim 1, wherein the processor is to receive electronic payment authorization from the subscriber.

13. The system of claim 1, wherein the processor is to cause the subscriber to be billed.

14. The system of claim 13, wherein the processor is to cause the subscriber to be billed by a wireless cellular provider.

15. The system of claim 1, wherein the processor is to negotiate anonymity with the payee.

16. The system of claim 15, wherein the processor is to reduce anonymity of the subscriber based on a negotiation with the payee.

* * * * *